Dec. 19, 1939.  J. MIHALYI  2,184,016
PHOTOGRAPHIC APPARATUS
Filed Nov. 5, 1937
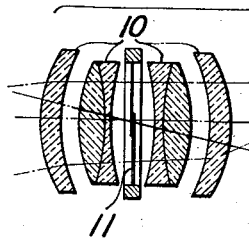
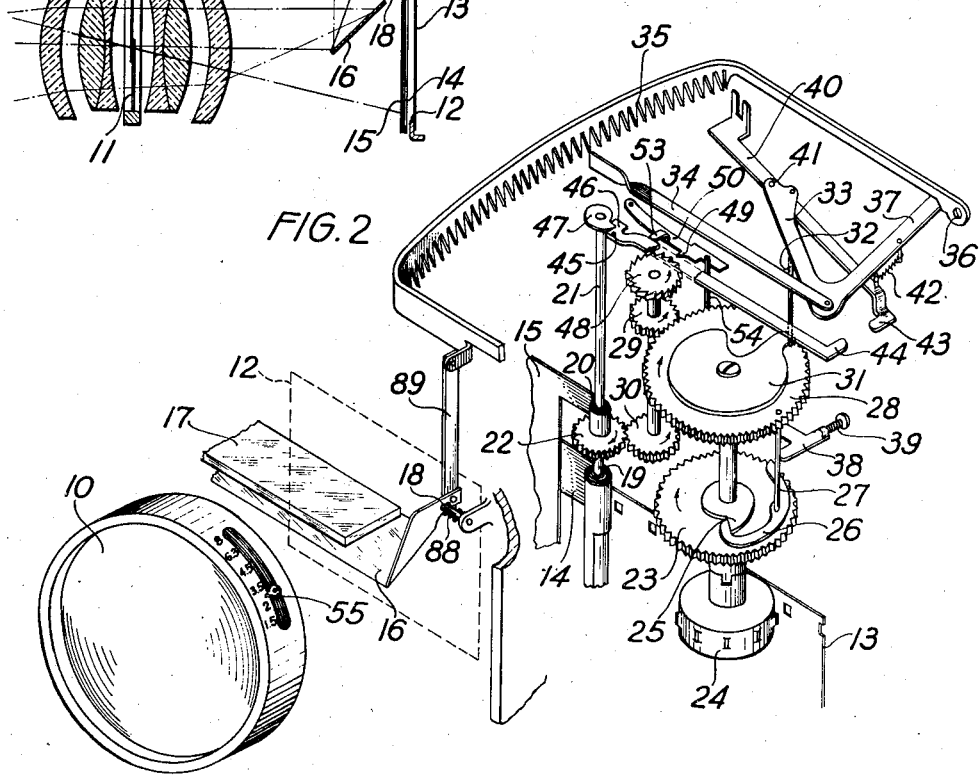
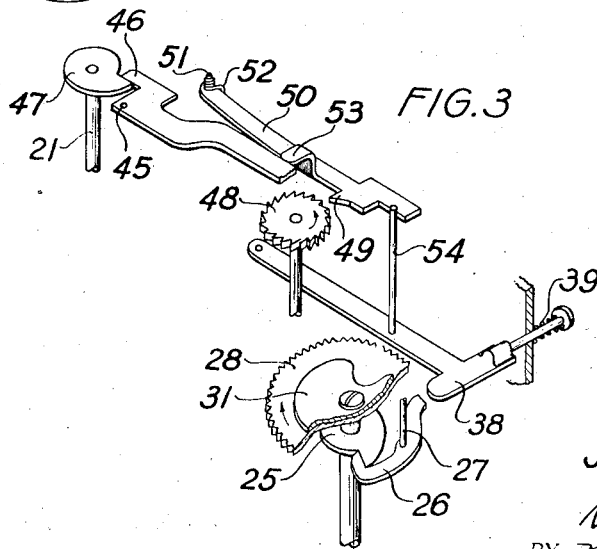
Joseph Mihalyi
INVENTOR
BY
ATTORNEYS Patented Dec. 19, 1939

2,184,016

UNITED STATES PATENT OFFICE 2,184,016

PHOTOGRAPHIC APPARATUS

Joseph Mihalyi, Rochester, N. Y., assignor to Eastman Kodak Company, Rochester, N. Y., a corporation of New Jersey Application November 5, 1937, Serial No. 173,002

3 Claims. (Cl. 95—57)

This invention relates to photographic apparatus and, particularly, to such apparatus provided with a light sensitive cell for regulating a photographic exposure.

It is an object of the present invention to provide a cell controlled mechanism for determining a photographic exposure period in accordance with the exposing light as determined by the opening of the objective lens and the prevailing light conditions.

Another object of the invention is the provision of means for controlling the width of the slit in a focal plane or curtain type shutter in accordance with the response of a light sensitive cell.

Another object of the invention is the provision of a cell controlled mechanism for automatically adjusting the exposure setting of a shutter upon the actuation of the camera release.

Still another object of the invention is the provision in a camera having a cell regulated focal plane shutter of means under the control of the shutter release for directing light transmitted from the camera objective onto the cell only when the shutter is in wound up condition.

Other objects and advantages of the invention will become apparent from the following description when read in connection with the accompanying drawing and its scope will be pointed out in the appended claims.

In the drawing,

Fig. 1 is a diagrammatic showing in section of the optical portions of a camera incorporating the invention;

Fig. 2 is a diagrammatic view in perspective of a cell controlled focal plane shutter and its release mechanism; and Fig. 3 is a detail view in perspective showing the manner in which the shutter release member governs the setting and release of the shutter.

In accordance with the invention, light transmitted by the camera objective and diaphragm is directed onto a light sensitive cell, the response of which energizes a meter element provided with a pointer or stop member for regulating the shutter speed setting. The response of the cell and the energization of the meter are suitably coordinated so that the shutter setting for proper exposure will be obtained.

In the particular embodiment illustrated, a camera objective 10 having a diaphragm 11 is positioned to form an image in an exposure aperture 12 at which a photographic element, such as a film 13, is adapted to be supported in any suitable well known manner. In front of the film 13 are curtains 14 and 15 of a focal plane shutter and in front of these curtains is arranged a light reflecting member 16 which receives light transmitted by the objective 10 and directs it onto a light sensitive cell 17 which may be mounted in the top wall of the exposure chamber. The reflector 16 is pivoted at 18 so that it may be rotated out of the path of the light going to the exposure aperture 12.

The shutter mechanism and its mode of operation are fully described in my copending application Serial No. 212,269, filed June 7, 1938, and is described herein only to the extent necessary for a complete understanding of the present invention. It is to be understood that the drawing is largely diagrammatic and that the several parts and their organization are purposely exaggerated for clarity; whereas the actual mechanism as made in practice is quite compact and when assembled with its other related parts is exceedingly complex.

The shutter curtain 14 is adapted to be wound on a drum 19 and the shutter curtain 15 is adapted to be wound on a spool 20. The drum 19 and the spool 20 are carried by a shaft 21 which also carries a gear 22 and to which the drum 19 and the spool 20 are coupled by a one-way clutch (not shown) so arranged that when the gear 22 is rotated in a clock-wise direction, as indicated by the arrow, the drum 19 and the spool 20 are driven, but which permits the curtain 14 to unwind the drum 19 independently of the spool 20. As fully described in my above-identified application, in winding the shutter all of the gears are rotated in the directions indicated by the arrows. A gear 23 which is driven for winding the shutter is connected to a sprocket 24 which advances the film 13 the necessary amount for presenting a fresh surface at the exposure aperture 12. The gear 23 has affixed thereto a single toothed ratchet 25 which is engaged by a latch member 26 pivoted by a pin 27 to another gear 28 so that the gear 28 is rotated upon rotation of the gear 23 in a clock-wise direction. The gear 28 is connected through a pinion 29 and gear 30 to the gear 22 which is affixed to the drum 19 carrying the shutter curtain 14. In this manner rotation of the gear 23 as indicated winds the shutter curtains 14 and 15 upon the drum 19 and the spool 20, respectively. The gear 28 is provided on its top surface with a cam 31, the periphery of which is adapted to contact a pin 32 carried by one arm of a bell crank lever 33, the function of which will be described below.

A meter pointer 34, which is adapted to be deflected in accordance with the activation of the cell 17 in a well known manner, is provided with an entrapping member 35 which is pivoted at 36 and adapted to be raised out of pointer entrapping position by the arm 37 of bell crank lever 33 when the shutter is in wound up position as shown in Fig. 2.

A camera release member 38 is adapted when depressed against the compression of a spring 39 to engage the latch 26 and rotate it about its pivot 27 to remove it from engagement with the ratchet 25, thereby permitting the spring tensioning means (not shown) to start unwinding the shutter curtain 14 from the drum 19. In unwinding the curtain 14, the drum 19 rotates the gear 22 in a counterclockwise direction and through the gear 30 and the pinion 29 rotates the gear 28 and its cam 31 in a counterclockwise direction. As the cam 31 thus rotates, the pin 32 follows the surface of the cam and permits the bell crank 33 to rotate about its pivot in a counterclockwise direction. This rotation removes the arm 37 from under the entrapping member 35, thereby leaving it free to be rotated about its pivot 36 to a position at which it entraps the pointer 34. This rotation is brought about by means of a spring 88 which is arranged to rotate the reflector 16 about its pivot 18. A rearwardly projecting part of the reflector mount is connected by a bar 89 to the entrapping member 35 so that as the reflector 16 is rotated toward the cell 17 to remove it from the path of the light passing from the objective 10 to the exposure aperture 12, the member 35 is pulled downwardly to pointer entrapping position.

Further rotation of the gear 28 and its cam 31 permits a following movement of the bell crank 33 until a stop arm 40 pivotally carried thereby engages the meter pointer 34. When the outer end of the stop arm 40 engages the pointer 34, further movement of the bell crank 33 rotates the arm 40 about its pivot 41 and against the tension of a spring 42 until its other end 43 engages and displaces a curtain lock lever 44. This lever 44 is pivoted at 45 and is provided with a latch 46 which engages a single lug ratchet 47 carried by the curtain shaft 21.

The shaft of the pinion 29 and the gear 30 is also provided with a ratchet 48 which is adapted to be engaged by a pawl 49 carried by an arm 50 pivoted at 51 and biased by a spring 52 to ratchet engaging position. The arm 50 is held against the force of the spring 52 by the lock lever 44 which engages a projecting lug 53 carried by the arm 50. This arm 50 is also adapted to be held against the force of the spring 52 by a projecting pin 54 carried by the release lever 38 so that whenever the release lever 38 is not depressed or the lock lever 44 is in position to hold the shutter curtain ratchet 47 against rotation, the arm 50 will be held in a position at which the pawl 49 does not engage the ratchet 48.

With the camera pointed toward a scene to be photographed, the diaphragm 11 of the objective 10 is adjusted by a movable element 55 to the desired aperture. The camera shutter is wound and the reflector 16 directs light onto the cell 17 so that the pointer assumes a position corresponding to the lighting of the scene and the opening of the diaphragm 11. Upon depressing the release trigger 38 the latch 26 is disengaged from the lug 25 permitting the tension on the shutter curtain 14 to rotate the gears 22, 30, 29 and 28 in directions opposite to those indicated by the arrows. Upon rotation of the gear 28 and its cam 31, the bell crank 33 and its cam following pin 32 move to the left as viewed in Fig. 2 thereby removing the arm 37 from under the trapping member 35 and permitting the spring 88 to move the member 35 to pointer entrapping position and to rotate the reflector 16 out of the light path.

The pressing of the release trigger 38 moved its pin 54 away from the pawl arm 50. As soon as the outer end of the arm 40 is stopped by the pointer 34, it rocks upon its pivot 41 so that the other end 43 of the arm strikes the curtain lock lever 44 and rotates it to disengage the ratchet 47 leaving it free to rotate. However, the unlatching movement of the lock lever 44 was followed by the arm 50 so that its pawl 49 has now engaged the ratchet wheel 48 to hold both the shutter curtains 14 and 15 against movement. It will thus be evident that during the above described operation the shutter curtain 14 has unwound by an amount corresponding to the position of the pointer 34 but that the curtain 15 has not moved. This results in the slit defined by the curtains 14 and 15 being set at a width determined by the position of the pointer 34. When pressure on the trigger 38 is released, the spring 39 forces it outwardly and the pin 54 carried thereby moves the pawl arm 50 to disengage the pawl 49 from the ratchet 48 whereupon the two shutter curtains 14 and 15 move together across the exposure aperture 12 with the slot between them of the size or width which was previously determined by the pointer 34.

The reflector 16 is preferably of such size and so positioned that it received light coming from the lower portion only of the scene to be photographed whereby the cell 17 does not receive light from the upper portion, usually the sky, of the scene.

With the arrangement illustrated the light input to the cell is directly controlled by the camera objective 10 and its diaphragm 11 and when other lenses, such as telephoto, are employed no adjustment of any kind is necessary to compensate for the different field angle or the like.

Although the invention has been described as applied to a curtain type focal plane shutter and with an arrangement whereby depressing the trigger actuates the shutter setting mechanism and releasing of the trigger trips the shutter for making an exposure, it will be obvious to those skilled in this art that other arrangements are available for practicing the invention without departing from the scope of the appended claims.

What I claim as new and desire to secure by Letters Patent of the United States is:

1. A photographic camera comprising a shutter for controlling an exposure interval, mechanism adjustable for altering the shutter interval, a movable stop member for determining the adjustment of said mechanism in accordance with the position of said stop member, a photoelectric device for controlling the position of the stop member, a trigger member biased to one position and movable to another position, means operable upon movement of the trigger member to said other position to adjust the setting of the shutter interval as determined by said stop member, and means operative upon the release of the trigger member to actuate the shutter to provide an exposure interval.

2. A photographic camera including a diaphragm, a focal plane shutter comprising two curtains independently movable to provide an exposure slot and jointly movable to produce an exposure, a trigger member movable successively through two ranges, means operable upon movement of the trigger member through its first range to move one curtain relatively to the other for adjusting the width of said slot, a light sensitive device for controlling the extent of the relative movement of the curtains thereby determining the width of the exposure slot, and means operative upon movement of the trigger member through its second range to move the curtains jointly to produce an exposure.

3. In a photographic camera in which a light sensitive device controls the exposure interval, a shutter mechanism including two parts relatively movable for adjusting the interval setting and jointly movable to provide an exposure, a first latching means for holding the shutter parts against joint movement, a second latching means for holding the shutter parts against joint movement, means for imparting relative movement to said parts to an extent determined by the light sensitive device, means actuated upon the completion of such relative movement to unlatch said first latching means and to latch said second latching means, and manually operated means for moving said second latching means to unlatched position, whereby the two shutter parts are free for joint movement.

JOSEPH MIHALYI.